United States Patent [19]
Ishida

[11] Patent Number: 5,329,380
[45] Date of Patent: Jul. 12, 1994

[54] IMAGE PROCESSING MACHINE
[75] Inventor: Shinichi Ishida, Tokyo, Japan
[73] Assignee: Canon Kabushiki Kaisha, Tokyo, Japan
[21] Appl. No.: 823,473
[22] Filed: Jan. 22, 1992
[30] Foreign Application Priority Data
  Jan. 28, 1991 [JP] Japan .................. 3-008501
[51] Int. Cl.$^5$ .................. H04N 1/40
[52] U.S. Cl. .................. 358/455; 382/50
[58] Field of Search .............. 358/429, 442, 448, 455, 358/456, 457, 458, 461, 463, 459; 382/50, 54; 340/721, 723, 747; H04N 1/40

[56] References Cited
U.S. PATENT DOCUMENTS

| | | | |
|---|---|---|---|
| 4,723,173 | 2/1988 | Tanioka | 358/457 |
| 4,821,334 | 4/1989 | Ogino et al. | 358/457 |
| 4,922,273 | 5/1990 | Yonekawa et al. | 358/429 |
| 4,924,509 | 5/1990 | Yokomizo | 382/50 |
| 4,969,052 | 11/1990 | Ishida et al. | 358/457 |
| 4,975,786 | 12/1990 | Katayama et al. | 358/459 |

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An image processing machine processes image data of a letter document into binary data which are then put through smoothing-out processing, and image data of a photograph document into binary data by a method in which the optical density of a document is retained, in order to provide high-quality, smooth binary images of both letter documents and photograph documents. One memory stores data both for smoothing-out processing in the case of a letter document and for binary-processing in the case of a photograph document. The memory is used selectively for either type of processing. Thus, circuitry for the processing is simplified.

15 Claims, 11 Drawing Sheets

FIG. 3

| INPUT | OUTPUT |
|---|---|
| 0 | 63 |
| 1 | 52 |
| 2 | 46 |
| 3 | 42 |
| 4 | 38 |
| 5 | 35 |
| 6 | 33 |
| 7 | 31 |
| 8 | 29 |
| 9 | 28 |
| 10 | 26 |
| 11 | 25 |
| 12 | 24 |
| 13 | 23 |
| 14 | 21 |
| 15 | 21 |
| 16 | 20 |
| 17 | 19 |
| 18 | 18 |
| 19 | 17 |
| 20 | 16 |
| 21 | 15 |
| 22 | 14 |
| 23 | 14 |
| 24 | 13 |
| 25 | 13 |
| 26 | 12 |
| 27 | 11 |
| 28 | 11 |
| 29 | 10 |
| 30 | 10 |
| 31 | 10 |
| 32 | 9 |
| 33 | 9 |
| 34 | 8 |
| 35 | 8 |
| 36 | 8 |
| 37 | 7 |
| 38 | 7 |
| 39 | 7 |
| 40 | 6 |
| 41 | 6 |
| 42 | 6 |
| 43 | 5 |
| 44 | 5 |
| 45 | 5 |
| 46 | 4 |
| 47 | 4 |
| 48 | 4 |
| 49 | 3 |
| 50 | 3 |
| 51 | 3 |
| 52 | 2 |
| 53 | 2 |
| 54 | 2 |
| 55 | 2 |
| 56 | 1 |
| 57 | 1 |
| 58 | 1 |
| 59 | 1 |
| 60 | 0 |
| 61 | 0 |
| 62 | 0 |
| 63 | 0 |

FIG. 8(a)

|     | X₁ | P₁ |
|-----|----|----|
| Q₁  | R₁ | S₁ |

|     | (X₁) | P₁  |     |     |
|-----|------|-----|-----|-----|
| Q₁  | R₁   | S₁  |     |     |

FIG. 8(b)

|     | X₂ | P₂ |
|-----|----|----|
| Q₂  | R₂ | S₂ |

|     | (X₁)   | (X₂) P₂ |     |     |
|-----|--------|---------|-----|-----|
|     |        | P₁      |     |     |
| Q₁  | R₁ Q₂  | S₁ R₂   | S₂  |     |

FIG. 8(c)

|     | X₃ | P₃ |
|-----|----|----|
| Q₃  | R₃ | S₃ |

|     | (X₁)   | (X₂) P₁ | (X₃) P₂ | P₃ |     |
|-----|--------|---------|---------|----|-----|
| Q₁  | R₁ Q₂  | S₁ R₂ Q₃ | S₂ R₃  | S₃ |     |

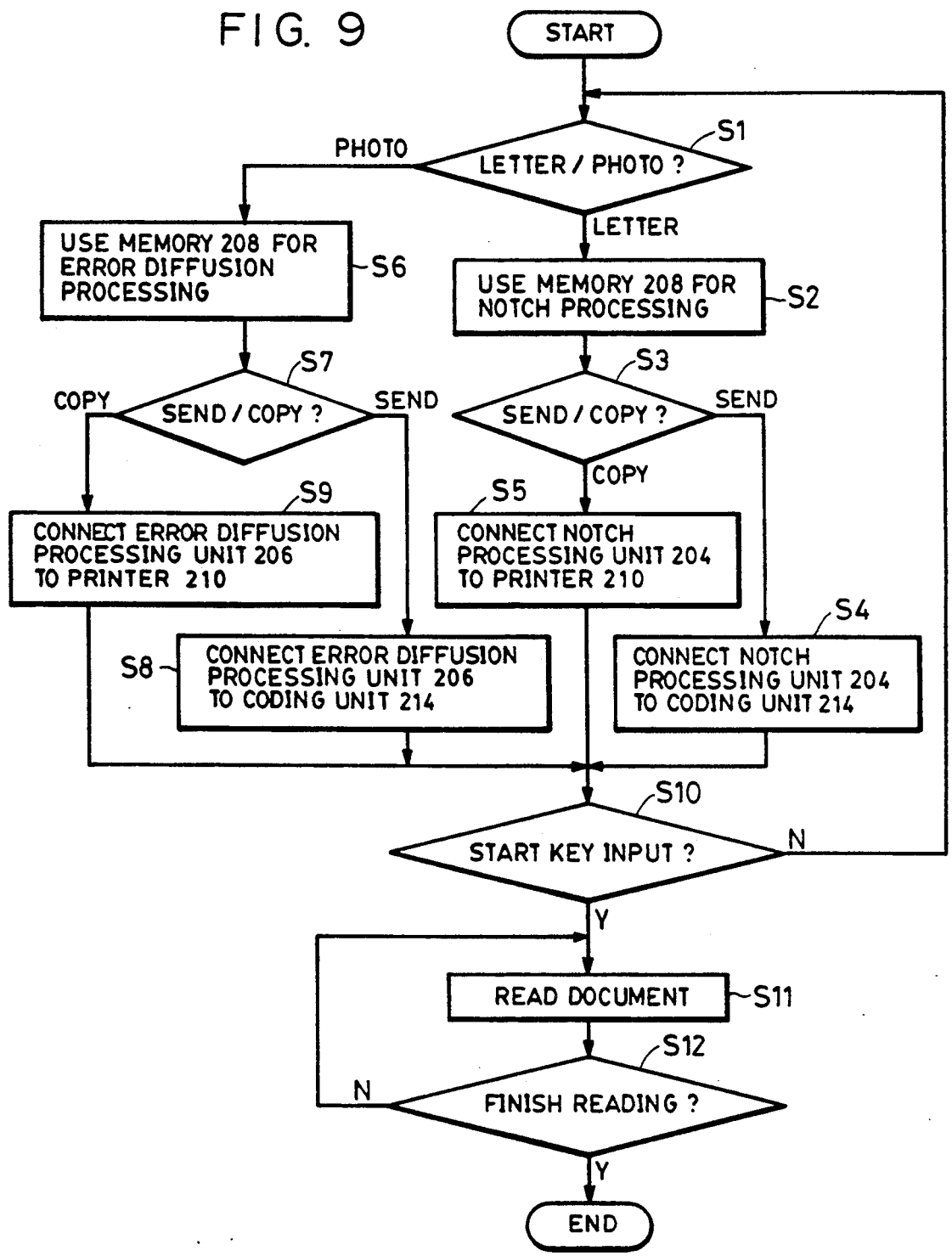

OBJECT PIXEL

IMAGE PROCESSING MACHINE

BACKGROUND OF THE INVENTION

1. Field Of the Invention

The present invention relates to an image processing machine such as a digital copying machine or a facsimile machine, and more particularly to an image processing machine which processes data obtained by reading written or picture documents into binary data, i.e. two values corresponding respectively to black and white.

2. Description of the Related Art

Facsimile or digital copying machines are conventionally known which read image information from documents or pictures with image sensors such as CCDs and which quantize the obtained image information, for example, into binary data and which send the data to recording devices or other machines, collectively "receivers".

In such a conventional machine, such binary processing is performed by using a fixed threshold in the case of a letter document and by using a method, such as the error diffusion method, in which optical density of an original image is retained in the case of a photograph document with or without letters.

U.S. Pat. Nos. 4,969,052 and 4,975,786 and U.S. patent application No. 505,972 (filed Apr. 4, 1990), all made by the present inventor, disclose machines which employ the error diffusion method to perform binary-processing.

In the case of a document having pictures with or without letters, such a conventional machine obtains smooth binary data which retain density of an original image because the binary processing is carried out by a density-retaining method such as the error diffusion method. However, in the case of a document of letters alone, the reproduced letters have rough or notched edge lines because the binary processing is done simply by using a fixed threshold.

SUMMARY OF THE INVENTION

It is an object of the present invention to solve the above problems of the conventional art by providing an image processing machine which provides high-quality, smooth images in the case of a letter document as well as in the case of a photograph document with or without letters.

It is another object of the present invention to provide an image processing machine which provides high-quality images employing simple processing circuits.

To achieve the above objects, an image processing machine according to the present invention comprises: reading means for reading an image of a document; first image processing means including binary-processing means for processing the image data provided by the reading means into binary data by using a fixed threshold and smoothing means for smoothing out the binary image provided by the binary-processing means; second image processing means for processing the image data provided by the reading means into binary data by using binary processing in which the optical density of a document is retained; and selecting means for selecting either the output of the first image processing means or the output of the second image processing means.

More preferably, an image processing machine according to the present invention further comprises a memory which is common to the first image processing means and the second image processing means and which is used selectively by one or the other of two image processing means.

It is still another object of the present invention to provide an image processing machine in which the number of bits of an error occurring during binary-processing of image data by the error diffusion method is reduced; in other words, the amount of data to be stored in the memory is reduced, so that a portion of the memory will remain available for other processing such as notch processing.

To achieve the above object, an image processing machine according to the present invention, which performs quantization by distributing errors occurring between input image data of object pixels and output image data obtained by quantizing the input image data, to image data of surrounding pixels of the object pixel, comprises: calculating means for calculating errors between the input image data and the output image data; weighting means for weighting the errors calculated by the calculating means, in a predetermined manner; and compensating means for compensating for errors by distributing the errors, weighted by the weighting means, to the surrounding pixels; and wherein the compensating means reduces the data amount of errors weighted by the weighting means and stores such errors in a memory before they are distributed to the surrounding pixels.

The above-mentioned and still other objects, features and advantages of the present invention will become apparent from the attached drawings and the below detailed description or the preferred embodiments with reference to those drawings.

BRIEF DESCRIPTION OF THE DRAWINGS

FIG. 3 shows one example of a table for conversion of luminance data to density data.

FIGS. 8(a), 8(b) and 8(c), illustrates the error diffusion process.

FIG. 9 is a flowchart of the control process by a CPU according to the second embodiment of the present invention.

DETAILED DESCRIPTION OF PREFERRED EMBODIMENTS

The First Embodiment

Figure 1:
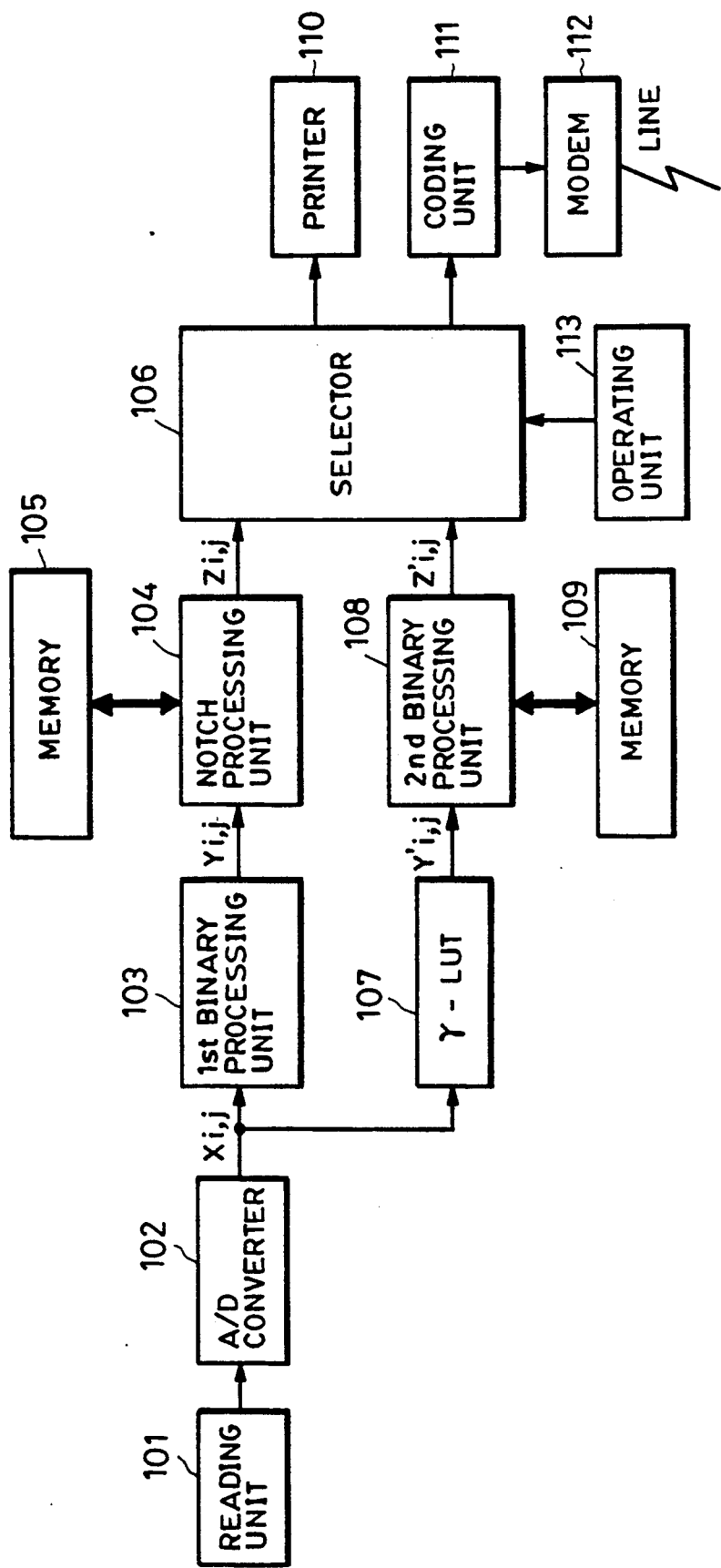
FIG. 1 is a block diagram illustrating a facsimile machine according to the first embodiment of the present invention.

FIG. 1 shows a block diagram of a facsimile machine according to this embodiment of the present invention, which reads image information from a document and quantizes the information into binary data and then outputs the binary data of an image to a printer or a coding unit.

In FIG. 1, a reading unit 101 includes a light source for illuminating a document surface, an image sensor for converting image information of the document into electric signals, and a driving means for conveying the document perpendicularly to the scanning direction.

An A/D converter 102 quantizes the analog signals obtained by the reading unit 101 into six-bit digital signals (number of bits, of course, is not critical). The quantized data are sent to a first binary-processing unit 103, which compresses the quantized data into two values, i.e. black and white, according to a fixed threshold TH. A signal $X_{i,j}$ from the A/D converter 102 is compressed by the binary-processing into an output datum $Y_{i,j}$ as follows:

$$X_{i,j} > TH \; Y_{i,j} = 0 (white)$$

$$X_{i,j} < TH \; Y_{i,j} = 1 (black)$$

The binary datum $Y_{i,j}$ is then sent to a notch-processing unit 104.

The above mentioned notch processing (smoothing out) is a technique for improving the quality of binary images. Binary letter images tend to have "notches", meaning recesses and projections which are not present in the original letters. Obviously, such notches result in low image quality. Further, in a machine, such as a facsimile machine, which compresses image data into binary data, notches cause a reduced compression ratio and require a long transmission time. In notch processing, such notches are detected and smoothed out.

The notch processing will be described hereinafter. The binary image of the original image is compared with eight notch-patterns in 3×3 matrixes shown in FIG. 2, which are provided beforehand, and thus notches are detected.

A notch is detected when a recess or projection of the binary image coincides with one of the notch patterns. The detected notch is removed. When the pixel of the notch is black, the pixel is switched to white. When the pixel is white, it is switched to black.

In the notch processing, an object pixel is compared with the two lines of pixels at the front and rear of the object pixel. A memory 105 shown in FIG. 1 stores the binary data of such two lines of pixels.

A datum $Z_{i,j}$ processed by the notch processing for improving image quality is sent to a selector 106.

Six-bit data quantized by the A/D converter 102 are also sent to a γ-LUT (gamma look-up table) 107, which converts luminance data to density data according to a table an example of which is shown in FIG. 3.

Density data are compressed into black/white binary data by a binary-processing unit 108. The binary-processing is performed by a method of density-retaining type, such as the error diffusion method, the average error least method and the average density retaining method.

Figure 4:
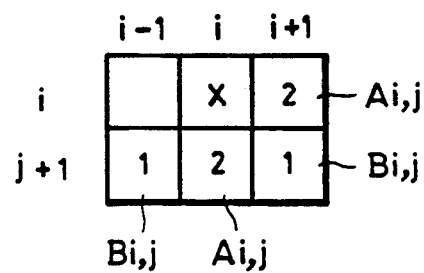
FIG. 4 shows one example of an error diffusion matrix.

In the error diffusion method, an error which occurs during binary-processing of image data of a object pixel is diffused to the neighboring pixels by a weighting filter like that shown in FIG. 4 as the binary-processing is thus carried out one pixel after another. A memory 109 shown in FIG. 1 stores the errors which are diffused into the pixels in the next line. A binary datum $Z'_{i,j}$ processed by a second binary-processing unit 108 is sent to the selector 106.

The binary processing by the error diffusion method performed by the second binary-processing unit 108 will be described in detail later in the description of the second embodiment of the present invention.

The selector 106 selects the datum $Z_{i,j}$ when the letter mode is selected at an operating unit 113 and the datum $Z'_{i,j}$ when the photograph mode is selected thereat. Further, the selector 106 selects to send the selected datum $Z_{i,j}$ or $Z'_{i,j}$ to a printer 110 when the copy mode is selected at the operating unit 113 and to send the datum $Z_{i,j}$ or $Z'_{i,j}$ to a coding unit 111 when the send mode is selected thereat. The printer 106 may be of thermo-sensitive recording type, laser-beam type or ink-jet type. The coding unit 111 codes the binary data received from the selector 106 by a known coding method such as MH or MR and then sends the coded data to a modem 112. The modem 112 modulates the coded data and sends out the modulated data to the line.

Figure 5:
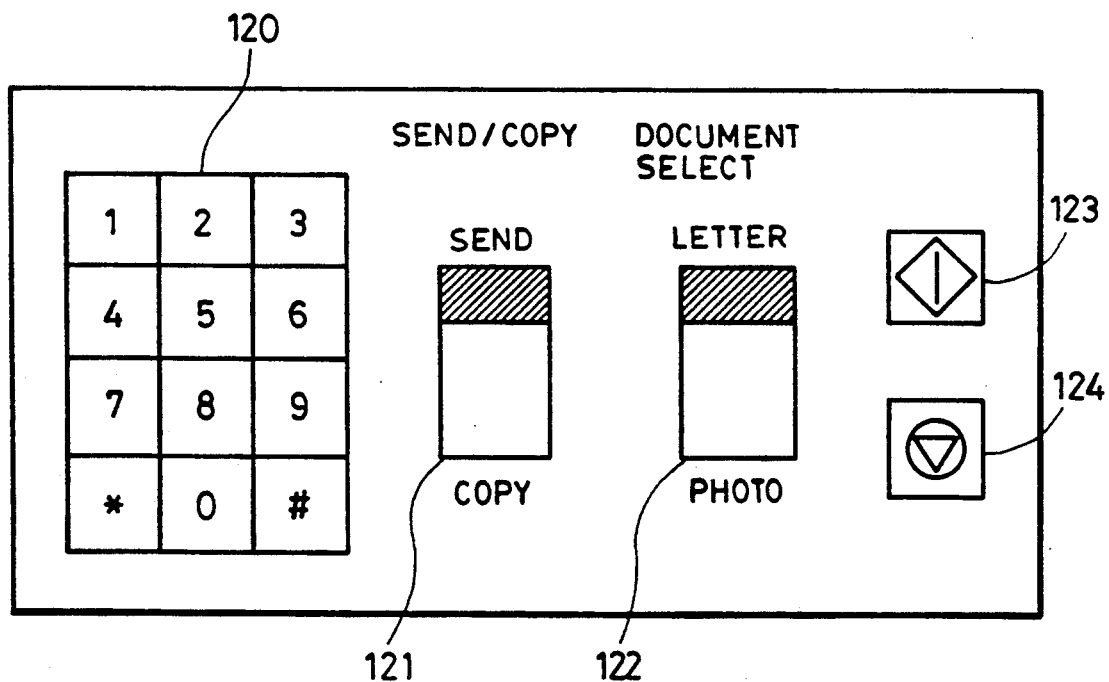
FIG. 5 is an exterior view of an operating unit.

Referring to FIG. 5, the operating unit 113 has on its exterior: a ten key 120; a selecting key 121 for selecting send or copy mode; another selecting key 122 for selecting the letter-mode binary processing or photograph-mode binary processing; a start key 123; and a stop key 124.

According to the first embodiment of the present invention, the notch processing is performed after the binary processing in the case of a letter document, and the error diffusion method is employed in the binary processing in the case of a photograph document with or without letters. Therefore, smoothly-outlined and highly-defined binary images can be obtained from letter or photograph documents.

Also, according to this embodiment, when the binary processing is performed by the error diffusion method, the γ-LUT 107 converts, as the pre-processing, luminance data greater than 60 into zero density. Therefore, grainy noises which occur during binary processing by the error diffusion method can be substantially reduced.

The Second Embodiment

According to the first embodiment, the two memories 105 and 109 are provided for the notch processing and for the binary processing by the error diffusion method respectively. However, according to the second embodiment, only one memory is provided for the above two kinds of processing. Such a memory is used selectively for either notch processing or binary processing.

If two memories are separately provided for the notch processing and the binary processing (error diffusion processing in this case), the memories take up a large portion of the base board, and costs also rise. If the two memories are simply combined into one in order to solve the above problems, it is necessary that such a memory have 1728 (the number of pixels on one scanning line)×9 bits i.e. the total of 1728×2 bits required for the notch processing and 1728×7 bits required for the error diffusion processing (since with six-bit data errors range from −63 to 63).

A memory capable of storing nine bits is substantially expensive compared with an eight-bit memory. Therefore, according to the second embodiment, one eight-bit memory is used selectively for either notch-processing or error diffusion processing.

Figure 6:
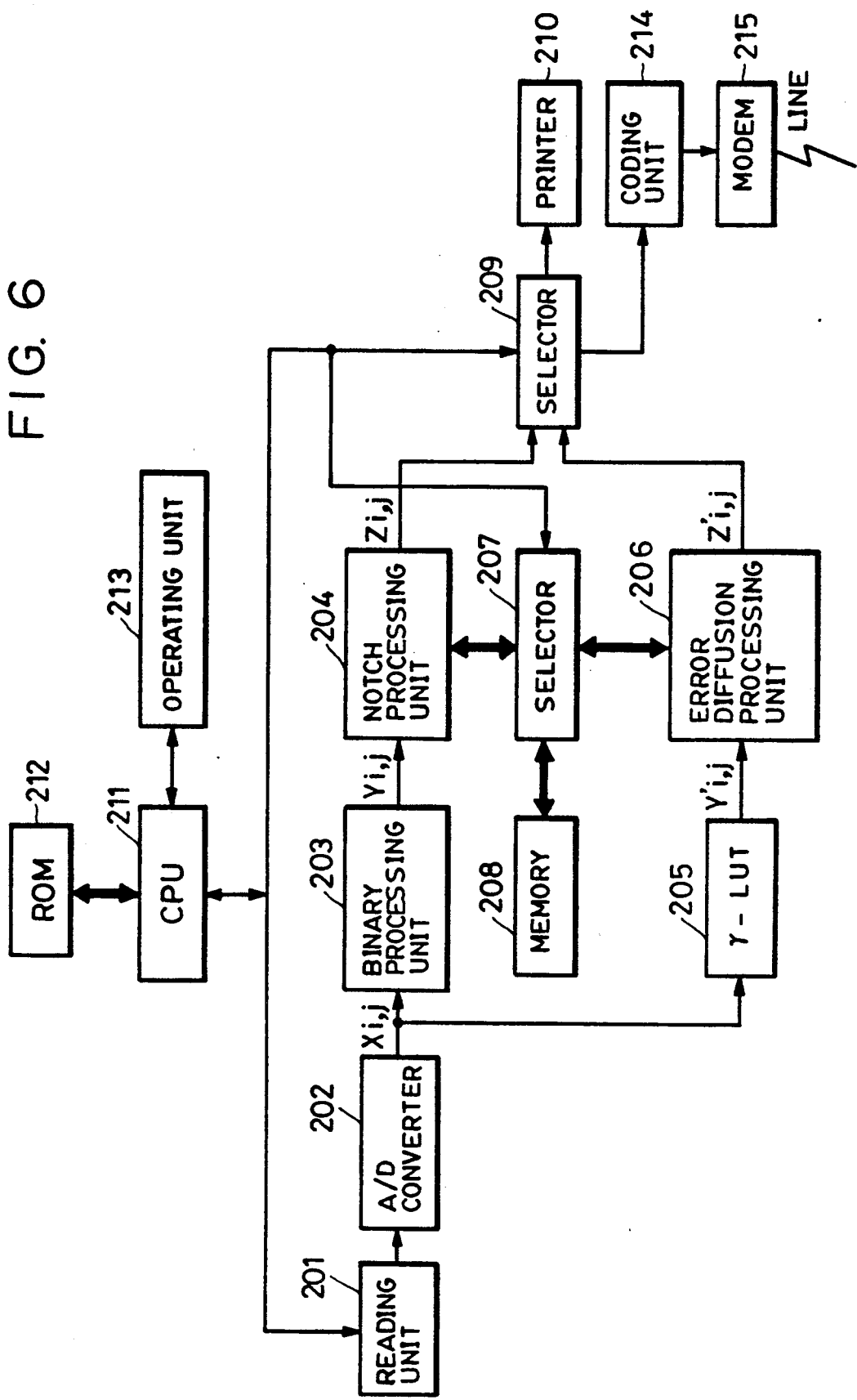
FIG. 6 is a block diagram illustrating a facsimile machine according to the second embodiment of the present invention.

With reference to FIG. 6, which shows a block diagram of a facsimile machine according to the second embodiment of the present invention, a reading unit 201 includes a photoelectric transfer element, such as a CCD, and a driving means for driving this element. The reading unit 201 scans and reads a document.

An A/D converter 202 quantizes image data read by the reading unit 201 into six-bit digital signals. Sixty-four graduations are provided in which the least luminance datum 000000 means the darkest black and the greatest luminance datum 111111 means the lightest white.

A CPU 211 controls the whole system of the facsimile machine. A read only memory (ROM) 212 stores the controlling program of the CPU 211.

An operating unit 213, the same as the unit shown in FIG. 5, is for operating the facsimile machine.

A signal $X_{i,j}$ quantized by the A/D converter 202 is sent to a binary-processing unit 203. The binary-processing unit 203 compresses the six-bit datum $X_{i,j}$ received from the A/D converter 202 into a black/white binary datum by using a fixed threshold TH. The signal $X_{i,j}$ is compressed into a binary output signal $Y_{i,j}$ as follows:

$$X_{i,j} \geq TH \ Y_{i,j}=0 (\text{white})$$

$$X_{i,j} < TH \ Y_{i,j}=1 (\text{black})$$

The binary datum $Y_{i,j}$ is sent to a notch-processing unit 204.

Figure 2:
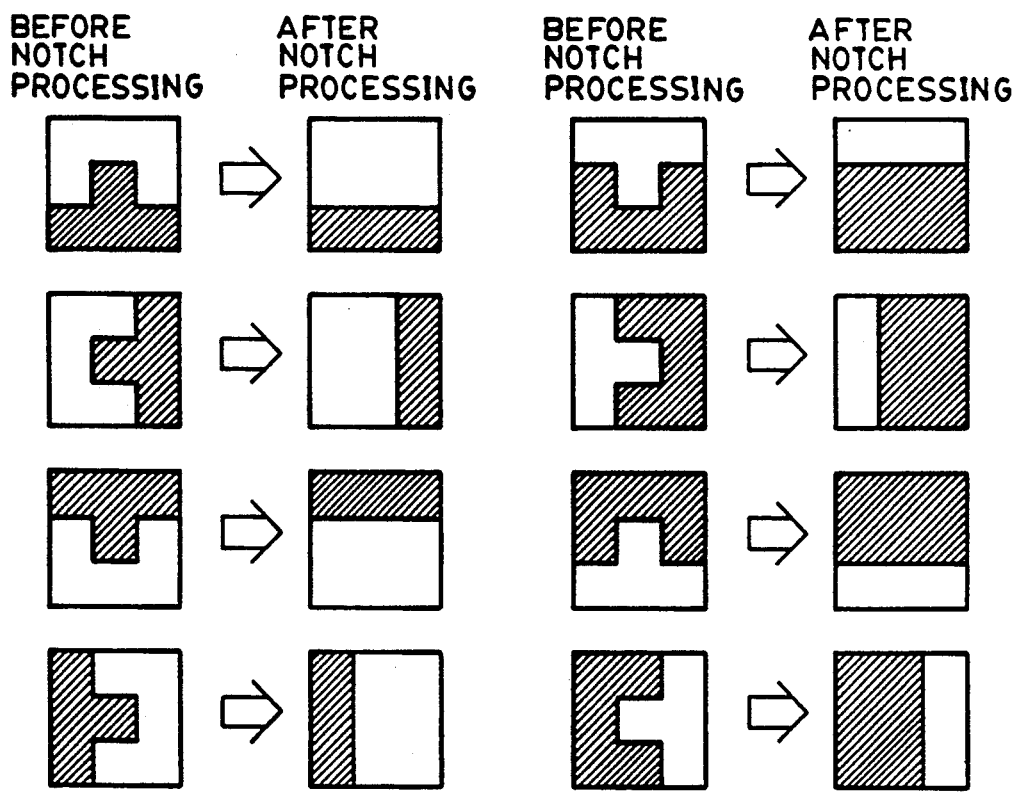
FIG. 2 illustrates binary images before and after notch-processing according to the first embodiment of the present invention.

The notch-processing unit 204 is provided beforehand with eight notch patterns in 3×3 matrices shown in FIG. 2. The binary image of the original image is compared with the notch patterns, and thus notches are detected. When the pixel of the detected notch is black, the pixel is switched to white. When the pixel is white, it is switched to black. In the notch processing, reference is made to three lines of pixels: one line including a object pixel; and two lines on both sides of the object pixel line. Therefore, binary data of two lines of pixels must be stored.

A memory 208 stores such data. The memory data length is eight bits. Although two bits for the notch processing and seven bits for the error diffusion processing are required, only one processing of the two is performed at a time. Thus, such a memory having eight-bit data length can be employed if it is used selectively for either notch processing or error diffusion processing. According to selection with a document key 122 in the operating unit 213 shown in FIG. 5, the CPU 211 sends a control signal to a selector 207 which, according to the control signal, switches data transference to the memory 208. An output datum $Z_{i,j}$ from the notch-processing unit 204 is sent to a selector 209.

Luminance data from the A/D converter 202 are also sent to a γ-LUT 205, i.e. a table for conversion of luminance data to density data. This table is composed of a six-bit ROM. A luminance datum $X_{i,j}$ from the A/D converter 202 is input to addresses A0 through A5, and then a density datum $Y'_{i,j}$ is output at output terminals D0 through D5 of the ROM. The density datum $Y'_{i,j}$ is sent to an error diffusion processing unit 206. The γ-LUT is shown in FIG. 3.

When the binary processing by the error diffusion processing unit 206 is selected, i.e. when the photograph mode is selected with the document key 122 in the operating unit 213, the CPU 211 sends the selector 207 a command that error data from the error diffusion processing unit 206 be stored in the memory 208.

Figure 7:
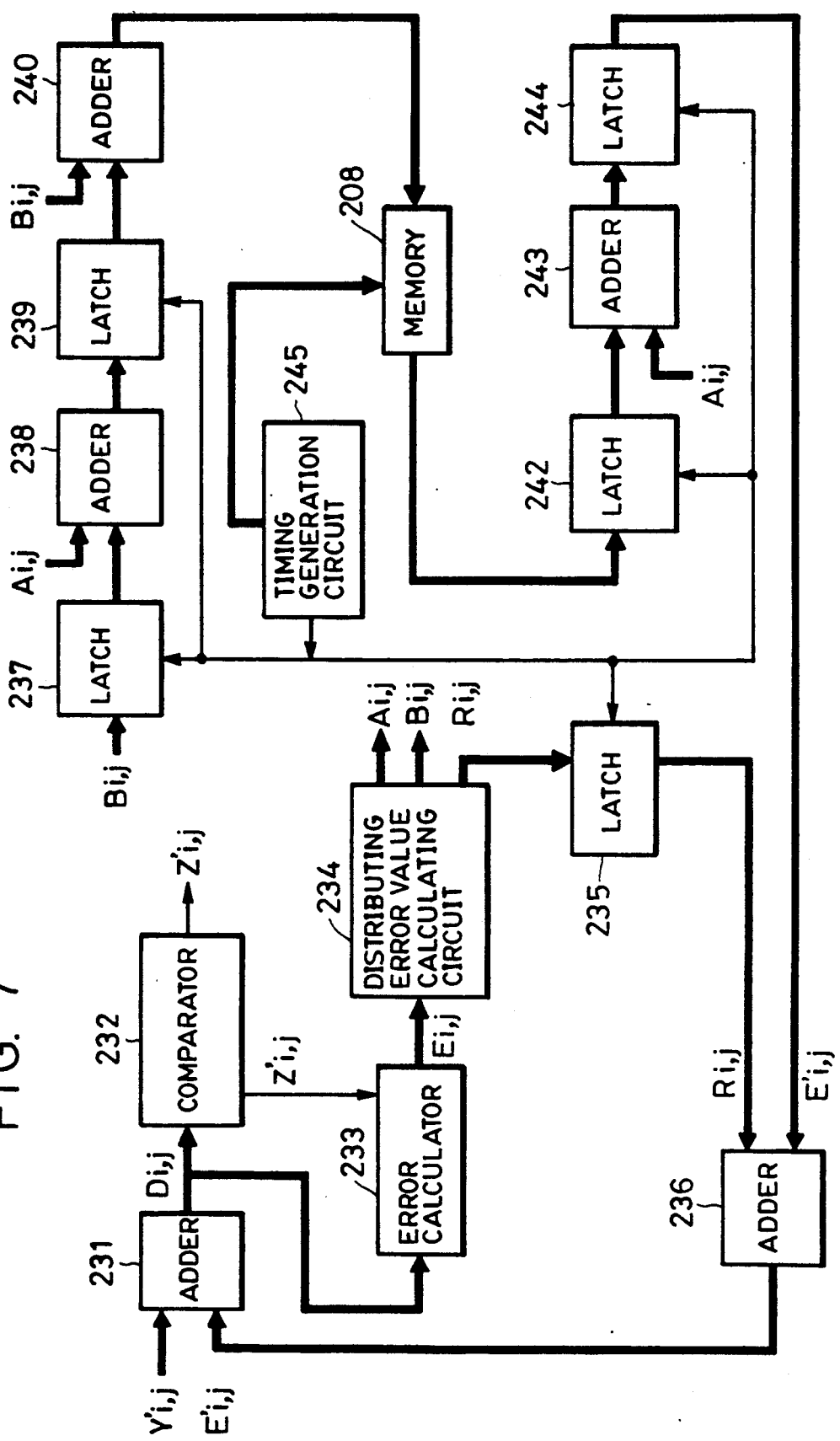
FIG. 7 is a detailed block diagram of the error diffusion processing unit shown in FIG. 6.

With reference to FIG. 7, the error diffusion processing unit 206 shown in FIG. 6 will be described in detail.

An adder 231 adds the density datum $Y'_{i,j}$ received from the γ-LUT 205 to an error datum $E'_{i,j}$, received from another adder 236, which has previously occurred during the binary processing.

A datum $D_{i,j}$ compensated by the adder 231 is expressed as:

$$D_{i,j}=Y'_{i,j}+E'_{i,j}$$

A comparator 232 processes the datum $D_{i,j}$ into a binary output datum $Z'_{i,j}$ by using a threshold T (T=32) as:

$$D_{i,j} \geq T \ Z'_{i,j}=63$$

$$D_{i,j} < T \ Z'_{i,j}=0$$

The datum $D_{i,j}$ is also sent to an error calculating unit 233. The error calculating unit 233 calculates an error $E_{i,j}$ from the datum $D_{i,j}$ and the binary output datum $Z'_{i,j}$ as:

$$E_{i,j}=D_{i,j}-Z'_{i,j}$$

The error $E_{i,j}$ is sent to a distributing error value calculating circuit 234, which calculates from the error $E_{i,j}$ error values $A_{i,j}$, $B_{i,j}$ and $R_{i,j}$ which are then distributed to four pixels surrounding a current object pixel.

A weight matrix illustrated in FIG. 4 shows to which pixels and in what ratio the error $E_{i,j}$ in an object pixel X is distributed. The distributing error value calculating circuit 234 determines values $A_{i,j}$ and $B_{i,j}$ shown in FIG. 4 as:

$$A_{i,j}=2 \times I_{nt}(E_{i,j} \times 1/6)$$

$$B_{i,j}=I_{nt}(E_{i,j} \times 1/6)$$

where $I_{nt}$ functions to discard the figures to the right of the decimal point.

The distributing error value calculating circuit 234 discards the figures to the right of the decimal point. In other words, it outputs integers only. Because the figures to the right of the decimal point are discarded, there is a remainder $R_{i,j}$ between the error in an object pixel and the total of the values $A_{i,j}$, $B_{i,j}$ which the distributing error value calculating circuit 234 calculates to distribute to four surrounding pixels. Such a remainder $R_{i,j}$ is expressed as:

$$R_{i,j}=E_{i,j}-2\times(A_{i,j}+B_{i,j})$$

The remainder $R_{i,j}$ is sent to a latch 235, where the remainder $R_{i,j}$ is retained to be added to the input datum $Y'_{i+1,j}$ of the next object pixel.

The value $A_{i,j}$ is sent to adders 243 and 238 in order to be distributed to pixels (i, j+1) and (i+1, j) respectively. The value $B_{i,j}$ is sent to a latch 237 and an adder 240 in order to be distributed to pixels (i+1, j+1) and (i−1, j+1) respectively.

The memory 208 has capacity for storing error data from one line of pixels and stores error values which are distributed to pixels on line j+1.

A timing generation circuit 245 generates various signals such as latch signals for latches 235, 237, 239, 242 and 244 and address signals for the memory 208.

The above-described error distribution will be further described in detail with reference to FIG. 8, which illustrates flows of the binary processing by the error diffusion method. Weighted error values $P_1$, $Q_1$, $R_1$ and $S_1$ of the error which occurs in an object pixel $X_1$ are sent to four surrounding pixels as shown in FIG. 8(a). The value $P_1$ is sent to the adder 243 shown in FIG. 7; the value $Q_1$ to the adder 240; the value $R_1$ to the adder 238; and the value $S_1$ to the latch 237. The value $Q_1$ is written into the first address of the memory 208.

When the object pixel shifts to the pixel $X_2$, error values $P_2$, $Q_2$, $R_2$ and $S_2$ are distributed to surrounding pixels as shown in FIG. 8(b). The value $P_2$ is sent to the adder 243. The value $Q_2$ is added to the value $R_1$ from the previous object pixel $X_1$ by the adder 240, and the total value $Q_2 + R_1$ is written into the second address of the memory 208. The value $R_2$ is added to the value $S_1$ from the pixel $X_1$ by the adder 238. The value $S_2$ is sent to the latch 237.

When the object pixel shifts to the pixel $X_3$, error values $P_3$, $Q_3$, $R_3$ and $S_3$ are distributed to surrounding pixels as shown in FIG. 8(c). The value $P_3$ is sent to the adder 243. The value $Q_3$, the value $S_1$ from the pixel $X_1$ and the value $R_2$ from the pixel $X_2$ are added by the adder 240, and the total value is written into the third address of the memory 208. The value $R_3$ and the value $S_2$ from the pixel $X_2$ are added by the adder 238. The value $S_3$ is sent to the latch 237.

When such processing is completed with all the pixels on this line, the memory 208 stores values as follows:

1st address—$M_1 = Q_1$
2nd address—$M_2 = R_1 + Q_2$
3rd address—$M_3 = S_1 + R_2 + Q_3$
4th address—$M_4 = S_2 + R_3 + Q_4$
ith address—$M_i = S_{i-2} + R_{i-1} + Q_i$ When the processing is performed on the next line of pixels, the error values distributed from the pixels of the previous line are read out from the memory 208. The error value read out for an object pixel is added to an error value distributed from the previous object pixel by the adder 243, and the total value is output from the latch 244. Reading out errors from the memory 208 is controlled by a timing generation circuit 235 so that error values from the pixels of the previous line corresponding to a current object pixel will be read out, i.e. an address $M_{i-3}$ of the memory 208 will be read out for an object pixel $X_i$.

By performing such processing on every input datum, the binary processing by the error diffusion method is carried out.

The error diffusion processing is performed only in the photo-document mode. When the photograph mode is selected with the document-select key of the operating unit 213, the selector 207 selects seven-bit error data E0 to E6 from the error diffusion processing unit 206 and sends the error data to the memory 208.

Binary data $Z_{i,j}$ and $Z'_{i,j}$ respectively processed by the notch-processing unit 204 and the error diffusion processing unit 206 are sent to a selector 209. The selector 209 selects one of the binary data $Z_{i,j}$ and $Z'_{i,j}$ according to the position of the document-select key 122 of the operating unit 213, i.e. according to the selected document mode. The selector 209 selects a datum $Z_{i,j}$ in the letter mode and a datum $Z'_{i,j}$ in the photograph mode. Then, the selector 209 sends the selected datum $Z_{i,j}$ or $Z'_{i,j}$ to a coding unit 214 or a printer 210 according to the position of the send/copy key 121 of the operating unit 213. The data coded by the coding unit 214 are modulated by a modem 215 and then sent out to the line.

FIG. 9 shows a flowchart of a control process carried out by the CPU 211. The CPU 211 sends signals to the selectors 207 and 209 according to the positions of the send/copy key 121 and the document-select key 122 of the operating unit 213.

With reference to FIG. 9, the position of the document-select key 122 is distinguished at a step S1. It is followed by a step S2 when the letter mode is selected, and is followed by a step S6 when the photograph mode is selected. At the step S2, a control signal is sent to the selector 207 so that the memory 208 will be used for the notch processing of the notch-processing unit 204. At a step S3, the position of the send/copy key 121 is distinguished. It is followed by a step S4 when the send mode is selected, and by a step S5 when the copy mode is selected. At the step S4, the selector 209 is set so as to send the binary data processed by the notch processing of the notch-processing unit 204 to the coding unit 214. At the step S5, the selector 209 is set so as to send the binary data processed by the notch processing of the notch-processing unit 204 to the printer 210.

At the step S6, the selector 207 is set so that the memory 208 will be used for the error diffusion processing of the error diffusion processing unit 206. At the next step S7, the position of the send/copy key 121 is distinguished. The process proceeds to a step S8 when the send mode is selected, and to a step S9 when the copy mode is selected. At the step S8, the selector 209 is set so as to send the coding unit 214 the binary data processed by the binary processing of the error diffusion processing unit 206. At the step S9, the selector 209 is set so as to send the printer 210 the binary data processed by the binary processing of the error diffusion processing unit 206.

At a step S10, it is checked whether a start key 123 is pressed or not. If it is pressed, the process goes to a step S11. When it is not pressed, the process goes back to the step S1. At the step S11, a command for reading a document is sent to the reading unit 201.

At a step S12, it is checked whether reading of the document is finished or not. When it is finished, the process comes to an end.

As described above, the eight-bit memory is used for the error diffusion processing in the photograph mode, and for the notch processing in the letter mode. Therefore, according to the second embodiment, the number of bits used in the memory can be reduced, and thus high-quality images can be obtained without raising costs or enlarging the circuit size.

The Third Embodiment

According to the third embodiment, seven-bit error data which occur during the error diffusion processing are processed into six-bit data, and thus two bits of the eight-bit memory can be used for the notch processing.

Figure 10:
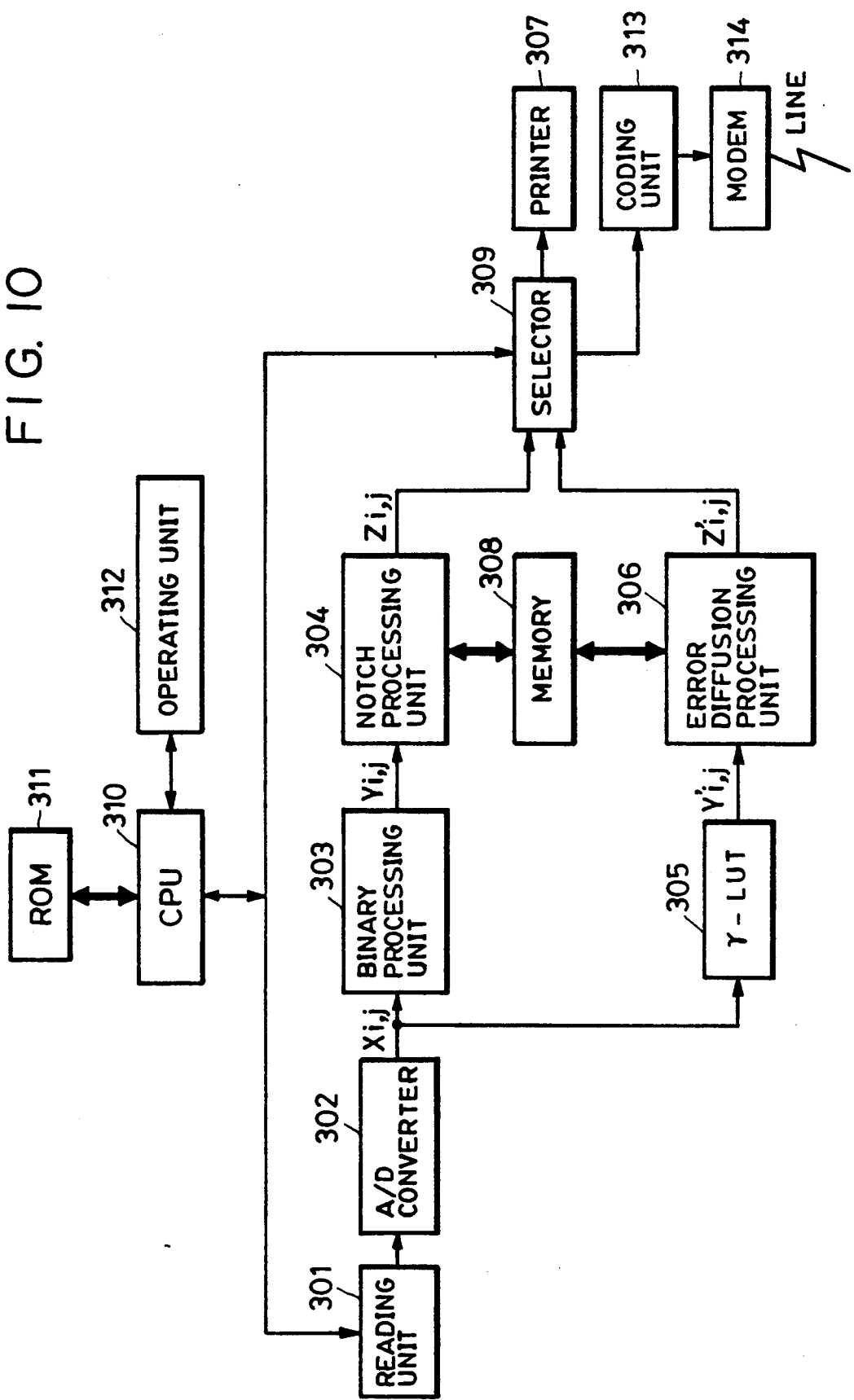
FIG. 10 is a block diagram illustrating a facsimile machine according to the third embodiment of the present invention.

FIG. 10 shows a block diagram of a facsimile machine according to third embodiment of the present invention. With reference to FIG. 10, a reading unit 301 includes a photoelectric transfer element, such as a CCD, and a driving means for driving this element. The reading unit 201 scans and reads a document.

An A/D converter 302 quantizes image data read by the reading unit 301 into six-bit digital signals. Sixty-four graduations are provided in which the least luminance datum 000000 means the darkest black and the greatest luminance datum 111111 means white. A CPU 310 controls the whole system of the facsimile machine. A read only memory (ROM) 311 stores the controlling program of the CPU 310.

An operating unit 312, the same as the unit shown in FIG. 5, is for operating the facsimile machine.

A signal $X_{i,j}$ quantized by the A/D converter 302 is sent to a binary-processing unit 303. The binary-processing unit 303 compresses the six-bit datum $X_{i,j}$ received from the A/D converter 302 into a black/white binary datum by using a fixed threshold TH. The signal $X_{i,j}$ is compressed into a binary output signal $Y_{i,j}$ as follows:

$$X_{i,j} \geq TH\ Y_{i,j}=0(\text{white})$$

$$X_{i,j} < TH\ Y_{i,j}=1(\text{black})$$

The binary datum $Y_{i,j}$ is sent to a notch-processing unit 304.

The notch-processing unit 304 is provided beforehand with eight notch patterns in 3×3 matrices shown in FIG. 2. The binary image of the original image is compared with the notch patterns, and thus notches are detected. When the pixel of the detected notch is black, the pixel is switched to white. When the pixel is white, it is switched to black. In the notch processing, reference is made to three lines of pixels: one line including a object pixel; and two lines on both sides of the object pixel line. Therefore, binary data of two lines of pixels must be stored.

The data length of a memory 308 is eight bits, and two bits of them are allotted to the notch processing.

Luminance data from the A/D converter 302 are also sent to a γ-LUT 305, i.e. a table for conversion of luminance data to density data. This table is composed of a six-bit ROM. A luminance datum $X_{i,j}$ from the A/D converter 202 is input to addresses A0–A5, and then a density datum $Y'_{i,j}$ is output at output terminals D0–D5 of the ROM. The density datum $Y'_{i,j}$ is sent to an error diffusion processing unit 306. The γ-LUT is like that shown in FIG. 3.

Figure 11:
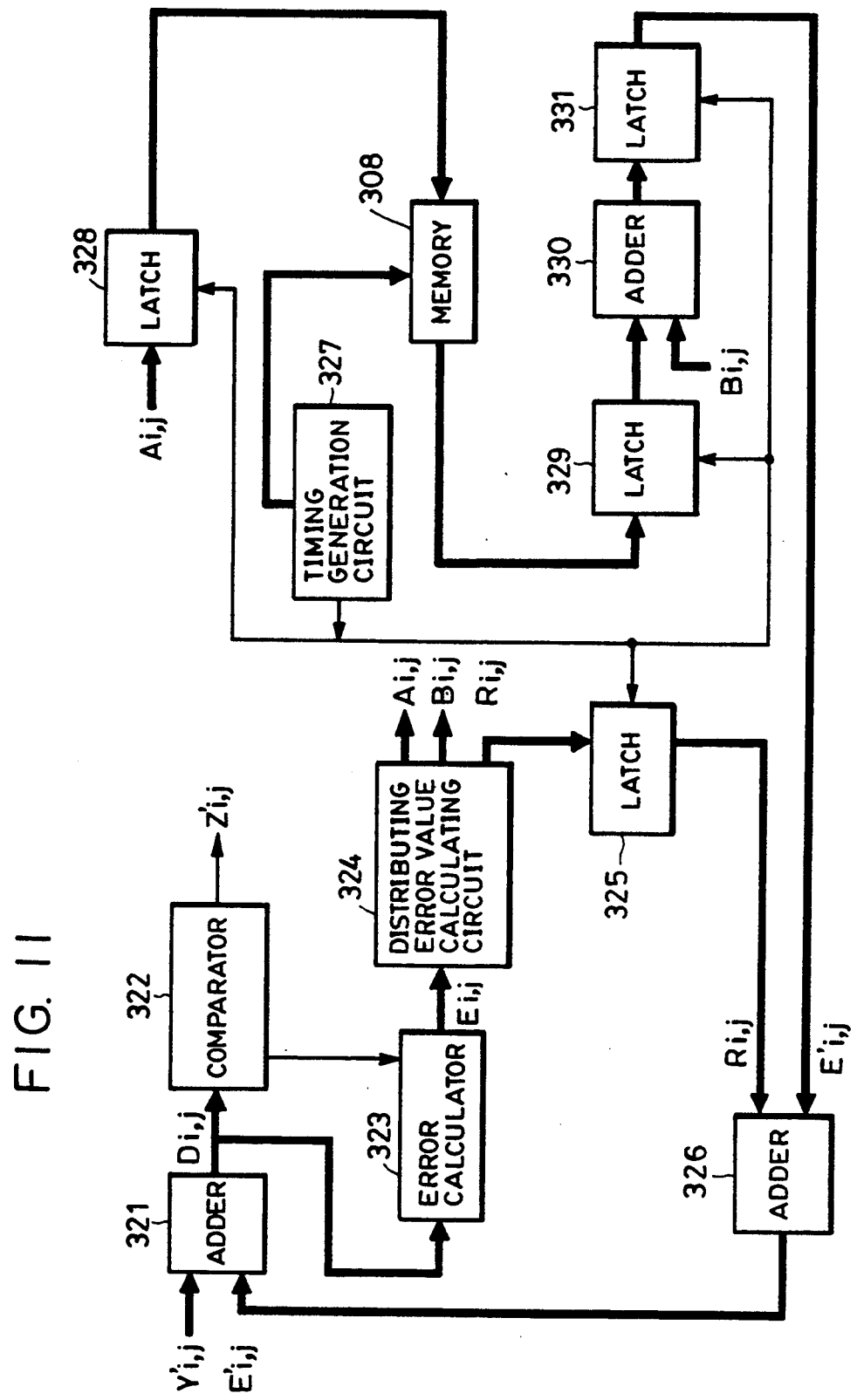
FIG. 11 is a detailed block diagram of the error diffusion processing unit shown in FIG. 10.

With reference to FIG. 11, the error diffusion processing unit 306 shown in FIG. 10 will be described in detail.

An adder 321 adds the density datum $Y'_{i,j}$ received from the γ-LUT 305 to an error datum $E_{i,j}$, received from another adder 326, which has previously occurred during the binary-processing.

A datum $D_{i,j}$ compensated by the adder 321 is expressed as:

$$D_{i,j}=Y_{i,j}+E_{i,j}$$

A comparator 322 processes the datum $D_{i,j}$ into a binary output datum $Z'_{i,j}$ by using a threshold T (T=32) as:

$$D_{i,j} \geq T\ Z'_{i,j}=63$$

$$D_{i,j} < T\ Z'_{i,j}=0$$

The datum $D_{i,j}$ is also sent to an error calculating unit 323. The error calculating unit 323 calculates an error $E_{i,j}$ from the datum $D_{i,j}$ and the binary output datum $Z'_{i,j}$ as:

$$E_{i,j}=D_{i,j}-Z'_{i,j}$$

The error $E_{i,j}$ is sent to a distributing error value calculating circuit 324, which calculates from the error $E_{i,j}$ error values which are then distributed to two pixels next to a current object pixel.

Figure 12:
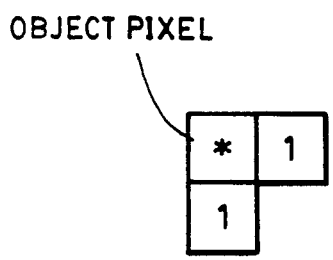
FIG. 12 shows one example of an error diffusion matrix.

A weight matrix illustrated in FIG. 12 shows to which pixels and in what ratio the error $E_{i,j}$ in an object pixel $X_{i,j}$ is distributed. The distributing error value calculating circuit 324 determines values $A_{i,j}$ and $B_{i,j}$ shown in FIG. 12 as:

$$A'_{i,j}=I_{nt}(E_{i,j} \times \tfrac{1}{2})$$

$$B'_{i,j}=I_{nt}(E_{i,j} \times \tfrac{1}{2})$$

where $I_{nt}$ functions to discard the figures to the right of the decimal point. The distributing error value calculating circuit 324 discards the figures to the right of the decimal point. In other words, it outputs integers only.

Although six bits of the memory 308 are allotted for the error diffusion processing, seven bits (−63 to +63) are required for expressing a normal value $A_{i,j}$. Therefore, at the distributing error value calculating circuit 324, a value $A_{i,j}$ which is to be input to the memory 308 is compressed into a six-bit datum, and a value discarded from the value $A_{i,j}$ in such a compression process is added to a value $B_{i,j}$, as follows:

(1) when $-32 < A'_{i,j} \leq 31$, $$A_{i,j}=A'_{i,j},\ B_{i,j}=B'_{i,j}+R_{i,j}$$

(2) when $A'_{i,j} \geq 32$, $$A_{i,j}=31,\ B_{i,j}=B'_{i,j}+(A'_{i,j}-31)+R_{i,j}$$

(3) when $A'_{i,j} \leq -32$, $$A_{i,j}=-31,\ B_{i,j}=B'_{i,j}+(A'_{i,j}-(-31))+R_{i,j}$$

where $R_{i,j}$ is the remainder occurring between the values $A_{i,j}$ and $B_{i,j}$ which are sent to the neighboring two pixels. The remainder $R_{i,j}$ is expressed as:

$$R_{i,j}=E_{i,j}-(A'_{i,j}+B'_{i,j})$$

The remainder $R_{i,j}$ is sent to a latch 325, where it is retained for adding to the input datum $Y'_{i+1,j}$ of the next object pixel.

The value $A_{i,j}$ is sent to a latch 328, where the value $A_{i,j}$ is retained for storing in the memory 308. The memory 308 stores error values which are to be distributed to pixels of the next line (j+1).

A timing generation circuit 327 generates various signals such as latch signals for latch circuits 328, 329 and 331 and address signals for the memory 308.

The CPU 310 sets a selector 309 according to the position of the document-select key of the operating unit 312. Since the memory has bits dedicated for the error diffusion processing and the notch processing according to this embodiment, the flow chart of a control process of the CPU will be made omitting the steps S2, S6 from the flowchart shown in FIG. 9.

Thus, according to the third embodiment, an error datum to be stored in the memory for the error diffusion processing is compressed into six-bit data, and the other error datum is put onto the next pixel aligned in the scanning direction. As a result, the higher two bits of the eight-bit memory remain available for other processing such as the notch processing.

Therefore, the number of bits used in a memory can be kept small.

As understood from the above description, according to the present invention, smooth, high-quality binary images can be obtained in the case of letter documents as well as in the case of photograph documents with or without letters, with simplified operation circuits.

Although the present invention has been illustrated with reference to the preferred embodiments, it is not limited by the above embodiments but can be practiced or embodied in various other ways within the scope of the claims.

What is claimed is:

1. An image processing apparatus comprising:
   inputting means for inputting image data;
   first image processing means including binary-processing means for processing the image data provided by said inputting means into binary data by using a predetermined threshold and smoothing means for smoothing out the binary data provided by said binary-processing means;
   second image processing means for processing the image data provided by said inputting means into binary data by using binary processing in which an error between input image data and the binary data is compensated for; and
   selecting means for selecting either output from said first image processing means or output from said second image processing means.

2. An image processing apparatus according to claim 1, further comprising a memory which is common to said first image processing means and said second image processing means and which is used selectively by said first image processing means or said second image processing means.

3. An image processing apparatus according to claim 2, wherein said memory is capable of storing an eight-bit datum for one pixel.

4. An image processing apparatus according to claim 1, further comprising recording means for recording an image based on the output selected by said selecting means.

5. An image processing apparatus according to claim 1, further comprising coding means for coding the output selected by said selecting means, and sending means for sending out the data coded by said coding means.

6. An image processing apparatus according to claim 1, further comprising manual selecting means for manually selecting either binary processing and smoothing processing by said first image processing means or binary processing by said second image processing means.

7. An image processing apparatus according to claim 1, wherein said smoothing means smooths out binary data by removing notches from an image represented by those binary data.

8. An image processing apparatus according to claim 1, wherein said second image processing means includes a conversion table for converting luminance data provided by said inputting means to density data, and wherein said second image processing means processes the density data from said conversion table into binary data by using a fixed threshold and compensates for errors occurring during the binary processing.

9. An image processing apparatus comprising:
   inputting means for inputting image data;
   first image processing means including binary-processing means for processing the image data provided by said inputting means into binary data by using a predetermined threshold and smoothing means for smoothing out the binary data provided by said binary-processing means;
   second image processing means for processing the image data provided by said inputting means into binary data by using binary processing in which an error between input image data and the binary data is compensated for; and
   a memory which is common to said first image processing means and said second image processing means and which is used selectively by said first image processing means or said second image processing means.

10. An image processing apparatus according to claim 9, further comprising recording means for recording an image based on the output selected by said selecting means.

11. An image processing apparatus according to claim 9, further comprising coding means for coding the output selected by said selecting means, and sending means for sending out the data coded by said coding means.

12. An image processing apparatus according to claim 9, further comprising manual selecting means for manually selecting either binary processing and smoothing processing by said first image processing means or binary processing by said second image processing means.

13. An image processing apparatus according to claim 9, wherein said smoothing means smooths out binary data by removing notches from an image represented by those binary data.

14. An image processing apparatus according to claim 9, wherein said second image processing means includes a conversion table for converting luminance data provided by said inputting means to density data, and wherein said second image processing means processes the density data from said conversion table into binary data by using a fixed threshold and compensates for errors occurring during the binary processing.

15. An image processing apparatus according to claim 9, wherein said memory is capable of storing an eight-bit datum for one pixel.

* * * * *

UNITED STATES PATENT AND TRADEMARK OFFICE
CERTIFICATE OF CORRECTION

PATENT NO. : 5,329,380

DATED : July 12, 1994

INVENTOR(S) : SHINICHI ISHIDA

It is certified that error appears in the above-identified patent and that said Letters Patent is hereby corrected as shown below:

ON TITLE PAGE

In [56] References Cited, under U.S. PATENT DOCUMENTS, insert:

```
-- 4,750,209   6/1988   Shimura et al. ...... 382/9
   4,868,684   9/1989   Suzuki .............. 358/455
   4,878,126  10/1989   Ichikawa ............ 358/451
   4,890,121  12/1989   Hirahara et al. ..... 346/76PH
   5,023,919   6/1991   Wataya .............. 382/54
```

FOREIGN PATENT DOCUMENTS

```
2170372   7/1986   United Kingdom .
0194689   9/1986   E.P.C. .
0227848   7/1987   E.P.C. .
0392781  10/1990   European Pat. Off. .
0404236  12/1990   European Pat. Off. .
```

OTHER PUBLICATIONS

Patent Abstracts of Japan, Vol. 10, No. 325 (E-451) 61-133772; Patent Abstracts of Japan, Vol. 14, No. 105 (E-895) 1-305772; Cugini et al., "Pattern-Directed Restoration and Vectorization of Digitized Engineering Drawings", Computers & Graphics, Vol. 8. No. 4, pp. 337-48 (1984); Patent Abstracts of Japan, Vol. 12, No. 403 (June 15, 1988); Patent Abstracts of Japan, Vol. 12, No. 461 (Dec. 5, 1988); Patent Abstracts of Japan, Vol. 13, No. 333 (July 26, 1989). --.

UNITED STATES PATENT AND TRADEMARK OFFICE
CERTIFICATE OF CORRECTION

PATENT NO. : 5,329,380
DATED : July 12, 1994
INVENTOR(S) : SHINICHI ISHIDA

It is certified that error appears in the above-identified patent and that said Letters Patent is hereby corrected as shown below:

<u>COLUMN 2</u>

Line 56, "illustrates" should read --illustrate--.

<u>COLUMN 3</u>

Line 26, "$X_{ij}>TH$" should read --$X_{ij} \geq TH$--.
   Line 62, "table" should read --table,--.
   Line 67, "error least" should read --least error--.

Signed and Sealed this

Twenty-first Day of February, 1995

Attest:

BRUCE LEHMAN

Attesting Officer     Commissioner of Patents and Trademarks